United States Patent
Kusafuka

(10) Patent No.: US 12,192,436 B2
(45) Date of Patent: Jan. 7, 2025

(54) INTEROCULAR DISTANCE MEASUREMENT METHOD AND CORRECTION METHOD

(71) Applicant: KYOCERA CORPORATION, Kyoto (JP)

(72) Inventor: Kaoru Kusafuka, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 244 days.

(21) Appl. No.: 17/922,076

(22) PCT Filed: Apr. 15, 2021

(86) PCT No.: PCT/JP2021/015623
§ 371 (c)(1),
(2) Date: Oct. 28, 2022

(87) PCT Pub. No.: WO2021/220832
PCT Pub. Date: Nov. 4, 2021

(65) Prior Publication Data
US 2023/0171394 A1    Jun. 1, 2023

(30) Foreign Application Priority Data
Apr. 28, 2020  (JP) ................. 2020-079551

(51) Int. Cl.
*H04N 13/366* (2018.01)
*G02B 27/01* (2006.01)
(Continued)

(52) U.S. Cl.
CPC ....... *H04N 13/366* (2018.05); *G02B 27/0101* (2013.01); *G02B 27/0179* (2013.01);
(Continued)

(58) Field of Classification Search
CPC .... H04N 13/366; H04N 13/327; H04N 13/31; H04N 13/363; G06T 7/70; G02B 30/32;
(Continued)

(56) References Cited

U.S. PATENT DOCUMENTS

| | | | |
|---|---|---|---|
| 6,970,290 B1 | 11/2005 | Mashitani et al. | |
| 2007/0279590 A1* | 12/2007 | Ebisawa ................ | A61B 3/113 351/208 |

(Continued)

FOREIGN PATENT DOCUMENTS

| | | |
|---|---|---|
| JP | 2001-166259 A | 6/2001 |
| WO | 2020/004258 A1 | 1/2020 |

OTHER PUBLICATIONS

Hwang et al., "User-friendly Inter-Pupillary Distance Calibration Method Using a Single Camera for Autostereoscopic 3D Displays", 2018 IEEE International Conference on Consumer Electronics (ICCE), 978-1-5386-3025-9/18, 2018.

*Primary Examiner* — Mohamed A. Wasel
(74) *Attorney, Agent, or Firm* — Procopio, Cory, Hargreaves & Savitch LLP

(57) ABSTRACT

An interocular distance measurement method is implementable by a three-dimensional display device including a display, a barrier, a detector, and a controller. The display displays a parallax image. The barrier provides parallax between eyes of a user. The detector detects a position of a face of the user. The method includes displaying an image, detecting a first position, detecting a second position, and calculating an interocular distance. The displaying an image includes displaying an image for interocular distance measurement. The detecting a first position includes detecting a first position of the face of the user in response to an instruction from the user. The detecting a second position includes detecting a second position of the face of the user in response to an instruction from the user. The calculating (Continued)

an interocular distance includes calculating an interocular distance of the user based on the first and the second positions.

8 Claims, 15 Drawing Sheets

(51) Int. Cl.
*G02B 30/32* (2020.01)
*G06T 7/70* (2017.01)
*H04N 13/31* (2018.01)
*H04N 13/327* (2018.01)
*H04N 13/363* (2018.01)

(52) U.S. Cl.
CPC ............... *G02B 30/32* (2020.01); *G06T 7/70* (2017.01); *H04N 13/31* (2018.05); *H04N 13/327* (2018.05); *H04N 13/363* (2018.05); *G02B 2027/0134* (2013.01); *G02B 2027/0181* (2013.01); *G02B 2027/0187* (2013.01)

(58) Field of Classification Search
CPC ............ G02B 27/0101; G02B 27/0179; G02B 2027/0134; G02B 2027/0181; G02B 2027/0187
See application file for complete search history.

(56) References Cited

U.S. PATENT DOCUMENTS

| | | | |
|---|---|---|---|
| 2009/0262302 A1* | 10/2009 | Chauveau | G02C 13/003 351/204 |
| 2009/0304232 A1* | 12/2009 | Tsukizawa | G06V 40/193 382/103 |
| 2012/0169730 A1* | 7/2012 | Inoue | H04N 13/128 345/419 |
| 2013/0195349 A1* | 8/2013 | Yamashita | H04N 13/128 382/154 |
| 2016/0314576 A1* | 10/2016 | Aliverti | G06T 7/60 |
| 2018/0284483 A1* | 10/2018 | Floyd | G02C 7/02 |
| 2020/0271447 A1* | 8/2020 | Aoki | G01B 11/00 |
| 2021/0038342 A1* | 2/2021 | Segawa | A61B 1/043 |
| 2021/0281825 A1 | 9/2021 | Kusafuka et al. | |

* cited by examiner

| | P1 | P2 | P3 | P4 | P5 | P6 | P7 | P8 | P9 | P10 | P11 | P12 |
|---|---|---|---|---|---|---|---|---|---|---|---|---|
| 0 | Left | Left | Left | Left | Left | Left | Right | Right | Right | Right | Right | Right |
| 1 | Right | Left | Left | Left | Left | Left | Left | Right | Right | Right | Right | Right |
| 2 | Right | Right | Left | Left | Left | Left | Left | Left | Right | Right | Right | Right |
| 3 | Right | Right | Right | Right | Left | Left | Left | Left | Left | Right | Right | Right |
| 4 | Right | Right | Right | Right | Right | Left | Left | Left | Left | Left | Right | Right |
| 5 | Right | Right | Right | Right | Right | Right | Right | Left | Left | Left | Left | Right |
| 6 | Right | Right | Right | Right | Right | Right | Right | Right | Left | Left | Left | Left |
| 7 | Left | Left | Left | Right | Right | Right | Right | Right | Left | Left | Left | Left |
| 8 | Left | Left | Left | Right | Right | Right | Right | Right | Right | Left | Left | Left |
| 9 | Left | Left | Left | Right | Right | Right | Right | Right | Right | Right | Left | Left |
| 10 | Left | Left | Left | Left | Left | Right | Right | Right | Right | Right | Left | Left |
| 11 | Left | Left | Left | Left | Left | Right | Right | Right | Right | Right | Right | Left |

FIG. 14

| | 6 | 7 | 8 | 9 | 10 | 11 | 0 | 1 | 2 | 3 | 4 | 5 |
|---|---|---|---|---|---|---|---|---|---|---|---|---|
| 0 | — | P2~P6 | P3~P7 | P4~P8 | P5~P9 | P6~P10 | — | P1 | P1~P2 | P1~P3 | P1~P4 | P1~P5 |
| 1 | P2~P6 | — | P3~P7 | P4~P7 | P5~P7 | P6~P7 | P7 | — | P2 | P2~P3 | P2~P4 | P2~P5 |
| 2 | P3~P6 | P3~P7 | — | P4~P8 | P5~P8 | P6~P8 | P7~P8 | P8 | — | P3 | P3~P4 | P3~P5 |
| 3 | P4~P6 | P4~P7 | P4~P8 | — | P5~P9 | P6~P9 | P7~P9 | P8~P9 | P9 | — | P4 | P4~P5 |
| 4 | P5~P6 | P5~P7 | P5~P8 | P5~P9 | — | P6~P10 | P7~P10 | P8~P10 | P9~P10 | P10 | — | P5 |
| 5 | P6 | P6~P7 | P6~P8 | P6~P9 | P6~P10 | — | P7~P11 | P8~P11 | P9~P11 | P10~P11 | P11 | — |
| 6 | — | P7 | P7~P8 | P7~P9 | P7~P10 | P7~P11 | — | P8~P12 | P9~P12 | P10~P12 | P11~P12 | P12 |
| 7 | P1 | — | P8 | P8~P9 | P8~P10 | P8~P11 | P8~P12 | — | P9~P13 | P10~P12 | P1, P11~P12 | P1, P12 |
| 8 | P1~P2 | P2 | — | P9 | P9~P10 | P9~P11 | P9~P12 | P9~P13 | — | P1, P10~P12 | P1, P11~P12 | P1~P2, P12 |
| 9 | P1~P3 | P2~P3 | P3 | — | P10 | P10~P11 | P10~P12 | P1, P10~P12 | P1~P2, P10~P12 | — | P1~P3, P11~P12 | P1~P3, P12 |
| 10 | P1~P4 | P2~P4 | P3~P4 | P4 | — | P11 | P11~P12 | P1, P11~P12 | P1~P2, P11~P12 | P1~P3, P11~P12 | — | P1~P4, P12 |
| 11 | P1~P5 | P2~P5 | P3~P5 | P4~P5 | P5 | — | P12 | P1, P12 | P1~P2, P12 | P1~P3, P12 | P1~P4, P12 | — |

INTEROCULAR DISTANCE MEASUREMENT METHOD AND CORRECTION METHOD

TECHNICAL FIELD

The present disclosure relates to an interocular distance measurement method, in particular, an interocular distance measurement method implementable by a three-dimensional display device, and a correction method for a three-dimensional display device.

BACKGROUND OF INVENTION

A known technique is described in, for example, Patent Literature 1.

CITATION LIST

Patent Literature

Patent Literature 1: Japanese Unexamined Patent Application Publication No. 2001-166259

SUMMARY

In an aspect of the present disclosure, an interocular distance measurement method is implementable by a three-dimensional display device. The method includes displaying an image, detecting a first position, detecting a second position, and calculating an interocular distance. The three-dimensional display device includes a display, a barrier, a detector, and a controller. The display displays a parallax image projected toward a first eye and a second eye of a user through an optical system. The barrier defines a traveling direction of image light of the parallax image to provide parallax between the first eye and the second eye. The detector detects a position of a face of the user. The displaying an image includes displaying an image for interocular distance measurement in a viewable section of the display determined based on a reference value of an interocular distance. The detecting a first position includes detecting a first position of the face of the user in response to an instruction, from the user, based on an image viewable with the first eye. The detecting a second position includes detecting a second position of the face of the user in response to an instruction, from the user, based on an image viewable with the second eye. The calculating an interocular distance includes calculating an interocular distance of the user through correction of the reference value based on the first position and the second position.

In another aspect of the present disclosure, a correction method is implementable by a three-dimensional display device. The method includes displaying an image, detecting a first position, detecting a second position, calculating an interocular distance, and correcting the display. The three-dimensional display device includes a display, a barrier, a detector, and a controller. The display displays a parallax image projected toward a first eye and a second eye of a user through an optical system. The barrier defines a traveling direction of image light of the parallax image to provide parallax between the first eye and the second eye. The detector detects a position of a face of the user. The displaying an image includes displaying an image for interocular distance measurement in a viewable section of the display determined based on a reference value of an interocular distance. The detecting a first position includes detecting a first position of the face of the user in response to an instruction, from the user, based on an image viewable with the first eye. The detecting a second position includes detecting a second position of the face of the user in response to an instruction, from the user, based on an image viewable with the second eye. The calculating an interocular distance includes calculating an interocular distance of the user through correction of the reference value based on the first position and the second position. The correcting the display includes correcting the display based on the interocular distance of the user.

BRIEF DESCRIPTION OF THE DRAWINGS

The objects, features, and advantages of the present disclosure will become more apparent from the following detailed description and the drawings.

FIG. 3 is a diagram of an example display illustrated in FIG. 1 viewed in a depth direction.

FIG. 5 is a diagram describing left viewable sections on the display illustrated in FIG. 1.

FIG. 6 is a diagram describing right viewable sections on the display illustrated in FIG. 1.

FIG. 13 is an example image table showing, with the interocular distance being a reference value, the positions of the left eye and the right eye, and the corresponding images to be displayed by subpixels.

FIG. 14 is an example overlap table showing the position of the left eye and the position of the right eye, and the corresponding binocular viewable sections.

DESCRIPTION OF EMBODIMENTS

As a three-dimensional (3D) display device with the structure that forms the basis of a 3D display device according to one or more embodiments of the present disclosure, a known 3D display device for glasses-free 3D viewing includes an optical element that directs a part of light from a display panel to reach a right eye of a user and another part of the light to reach a left eye of the user.

An embodiment of the present disclosure will now be described in detail with reference to the drawings. The drawings used herein are schematic and are not drawn to scale relative to the actual size of each component.

Figure 1:
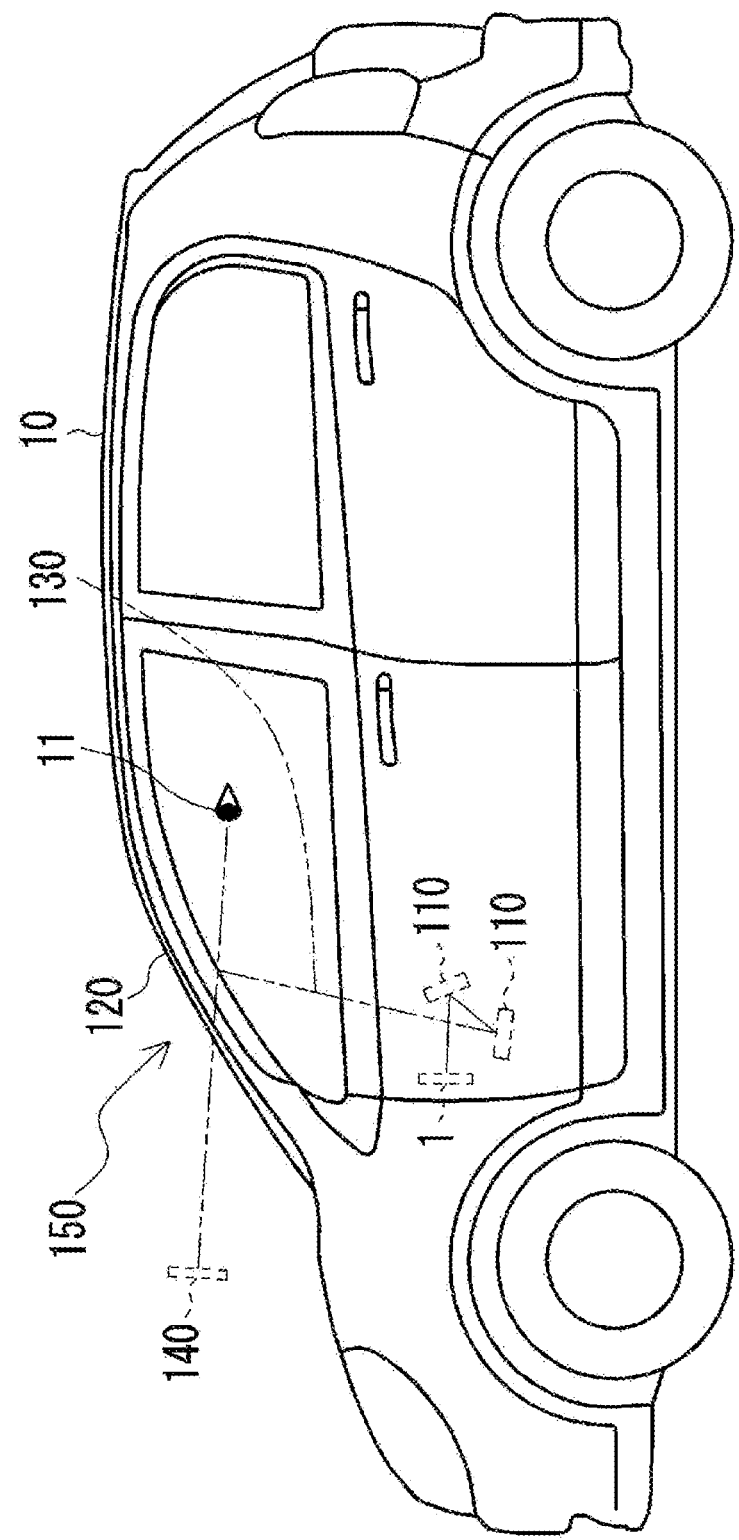
FIG. 1 is a schematic diagram of an example movable body incorporating a head-up display including a three-dimensional (3D) display device.

In one embodiment of the present disclosure, an interocular distance measurement method may be implementable by a 3D display device 1. As illustrated in FIG. 1, the 3D display device 1 may be mounted on a movable body 10.

Examples of the movable body in the present disclosure include a vehicle, a vessel, and an aircraft. Examples of the vehicle in the present disclosure include, but are not limited to, an automobile and an industrial vehicle, and may also include a railroad vehicle, a community vehicle, and a fixed-wing aircraft traveling on a runway. Examples of the automobile include a passenger vehicle, a truck, a bus, a motorcycle, and a trolley bus. Examples of the automobile also include another vehicle traveling on a road. Examples of the industrial vehicle include an industrial vehicle for agriculture and an industrial vehicle for construction. Examples of the industrial vehicle also include a forklift and a golf cart. Examples of the industrial vehicle for agriculture include a tractor, a cultivator, a transplanter, a binder, a combine, and a lawn mower. Examples of the industrial vehicle for construction include a bulldozer, a scraper, a power shovel, a crane vehicle, a dump truck, and a road roller. Examples of the vehicle include man-powered vehicles. The classification of the vehicle is not limited to the above examples. Examples of the automobile include an industrial vehicle travelling on a road. One type of vehicle may fall within multiple classes. Examples of the vessel in the present disclosure include a jet ski, a boat, and a tanker. Examples of the aircraft in the present disclosure include a fixed-wing aircraft and a rotary-wing aircraft.

The movable body 10 is herein a vehicle, in particular, a passenger vehicle. The movable body 10 is not limited to a passenger vehicle, and may be any of the vehicles, vessels, and aircrafts listed above.

As illustrated in FIG. 1, a head-up display (HUD) 100 may incorporate the 3D display device 1. The HUD 100 includes the 3D display device 1, an optical system 110, and a projection reception member 120. The HUD 100 directs image light from the 3D display device 1 to the projection reception member 120 with the optical system 110. The projection reception member 120 may be a windshield of the movable body 10. The HUD 100 directs image light reflected from the projection reception member 120 to reach eyes 11 of the user. The HUD 100 directs the image light to travel from the 3D display device 1 to the eyes 11 of the user along an optical path 130 indicated by a broken line. The user can thus view image light reaching the eyes along the optical path 130 as a virtual image 140.

Figure 2:
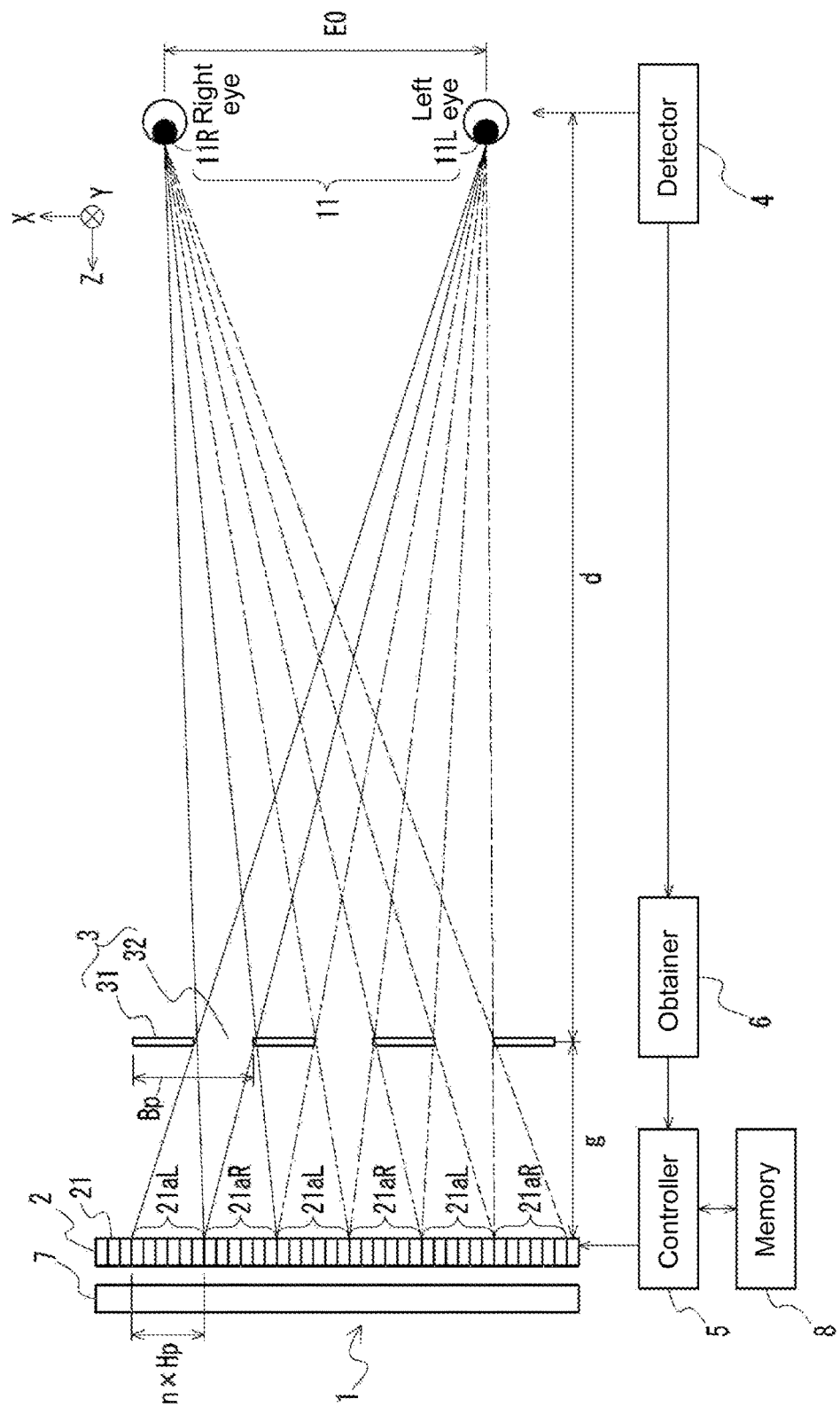
FIG. 2 is a diagram of the 3D display device viewed in a vertical direction.

As illustrated in FIG. 2, the 3D display device 1 includes a display 2, a barrier 3, a detector 4, and a controller 5. The display 2 may be referred to as a display panel. The barrier 3 may be referred to as a parallax barrier. The 3D display device 1 may include an obtainer 6, an illuminator 7, and a memory 8.

The 3D display device 1 may include an input unit for receiving an operation performed by the user. Examples of the operation performed by the user include various instructions provided from the user to the 3D display device 1. The user can operate the input unit to provide an instruction to the 3D display device 1. The input unit may include operation buttons and a touch panel. The input unit may include voice input-output interfaces such as a microphone and a speaker to receive voice instructions.

The detector 4 can detect the position of the face of the user. The detector 4 can transmit the detected position of the face to the controller 5. The detector 4 may be at any position inside or outside the movable body 10. The detector 4 may be inside a dashboard in the movable body 10. The detector 4 may output, to the controller 5, information about the detected position of the face, for example, with wires, wirelessly, or through a controller area network (CAN).

The detector 4 may include a camera. The camera may include a charge-coupled device (CCD) image sensor or a complementary metal-oxide semiconductor (CMOS) image sensor. The detector 4 may be a monocular camera or a stereo camera. The detector 4 may capture an image of the face of the user with the camera. The detector 4 may not capture an image of the entire face of the user. The detector 4 may capture an image of feature points included in the face of the user for identifying the position of the head of the user. The feature points may include the user's eyebrows, eyes, nose, and lips.

The detector 4 may include no camera and may be connected to an external camera. The detector 4 may include an input terminal for receiving a signal from the external camera. The external camera may be connected to the input terminal directly. The external camera may be connected to the input terminal indirectly through a shared network. The detector 4 including no camera may include an input terminal for receiving an image signal from a camera. The detector 4 including no camera may detect the position of the face of the user based on the image signal received through the input terminal.

The detector 4 may include a sensor. The sensor may be an ultrasonic sensor or an optical sensor. The detector 4 may detect the position of the face of the user with the sensor.

The 3D display device 1 may not include the detector 4. In this case, the 3D display device 1 may include an input terminal for receiving signals from an external detector. The external detector may be connected to the input terminal. The external detector may use electrical signals or optical signals as transmission signals transmitted to the input terminal. The external detector may be connected to the input terminal indirectly through a shared network. The 3D display device 1 may receive positional coordinates about the position of the face of the user input from the external detector.

The obtainer 6 obtains the position of the face of the user detected by the detector 4.

The illuminator 7 may illuminate a surface of a display panel 2. The illuminator 7 may include a light source, a light guide plate, a diffuser plate, and a diffuser sheet. The illuminator 7 emits illumination light using the light source and spreads the illumination light uniformly for illuminating the surface of the display panel 2 using, for example, the light guide plate, the diffuser plate, or the diffuser sheet. The illuminator 7 can emit the uniform light toward the display panel 2.

The display panel 2 displays a parallax image projected toward the right eye and the left eye of the user through the optical system 110. The display panel 2 may be, for example, a transmissive liquid crystal display panel. The optical system 110 directs image light emitted from the display panel 2 to reach the eyes of the user. The 3D display device 1 may include the optical system 110. The optical system 110 may include one or more mirrors. The optical system 110 may include the windshield of the movable body 10. The optical system 110 may be at any position inside or outside the movable body 10. As illustrated in FIG. 2, the display panel 2 includes a planar active area 21 including multiple divisional sections. The active area 21 can display a composite image. The composite image includes a left eye image and a right eye image having parallax with the left eye image as described later. The composite image includes a third image described later. The divisional sections are defined in a lattice-like black matrix 22 in a first direction and in a second direction perpendicular to the first direction. The direction perpendicular to the first and second directions is referred to as a third direction. The first direction may be referred to as a horizontal direction. The second direction may be referred to as a vertical direction. The third direction may be referred to as a depth direction. However, the first, second, and third directions are not limited to the directions referred to above. In the drawings, the first direction refers to x-direction, the second direction to y-direction, and the third direction to z-direction.

Each divisional section corresponds to a subpixel. Thus, the active area 21 includes multiple subpixels arranged in a lattice in the horizontal and vertical directions.

Each subpixel has one of the colors red (R), green (G), and blue (B). One pixel may be a set of three subpixels with R, G, and B. A pixel may be referred to as a picture element. For example, multiple subpixels included in one pixel are arranged in the horizontal direction. For example, subpixels having the same color are arranged in the vertical direction. The display panel 2 is not limited to a transmissive liquid crystal panel but may be another display panel such as an organic EL display. For the display panel 2 being a self-luminous display panel, the 3D display device 1 may not include the illuminator 7.

As described above, multiple subpixels arranged in the active area 21 form subpixel groups Pg. The subpixel groups Pg are repeatedly arranged in the horizontal direction. The subpixel groups Pg are repeatedly arranged in the vertical direction at positions shifted by one subpixel in the horizontal direction from the corresponding subpixel group in adjacent rows. The subpixel groups Pg each include subpixels in predetermined rows and columns. More specifically, the subpixel groups Pg each include (2×n×b) subpixels P1 to P(2×n×b), which are consecutively arranged in b row(s) in the vertical direction and in 2×n columns in the horizontal direction. In the example illustrated in FIG. 3, n is 6, and b is 1. The active area 21 includes the multiple subpixel groups Pg. The subpixel groups Pg each include twelve subpixels P1 to P12 consecutively arranged in one row in the vertical direction and in twelve columns in the horizontal direction. In the example illustrated in FIG. 3, some of the subpixel groups Pg are denoted by reference signs.

Each subpixel group Pg is the smallest unit to be controlled by the controller 5 (described later) to display an image. The subpixels P1 to P(2×n×b) included in each subpixel group Pg with the same identification information are controlled by the controller 5 at the same time or sequentially. For example, the controller 5 switches the image to be displayed by the subpixels P1 from the left eye image to the right eye image at the same time in all the subpixel groups Pg. For example, the controller 5 switches the image to be displayed by a subpixel P1 in a subpixel group Pg from the left eye image to the right eye image and sequentially switches the subsequent subpixels P1 in other subpixel groups Pg.

As illustrated in FIG. 2, a parallax barrier 3 is a plane along the active area 21. The parallax barrier 3 is separate from the active area 21 by a predetermined distance (gap) g. The parallax barrier 3 may be located opposite to the illuminator 7 from the display panel 2. The parallax barrier 3 may be located between the display panel 2 and the illuminator 7.

Figure 4:
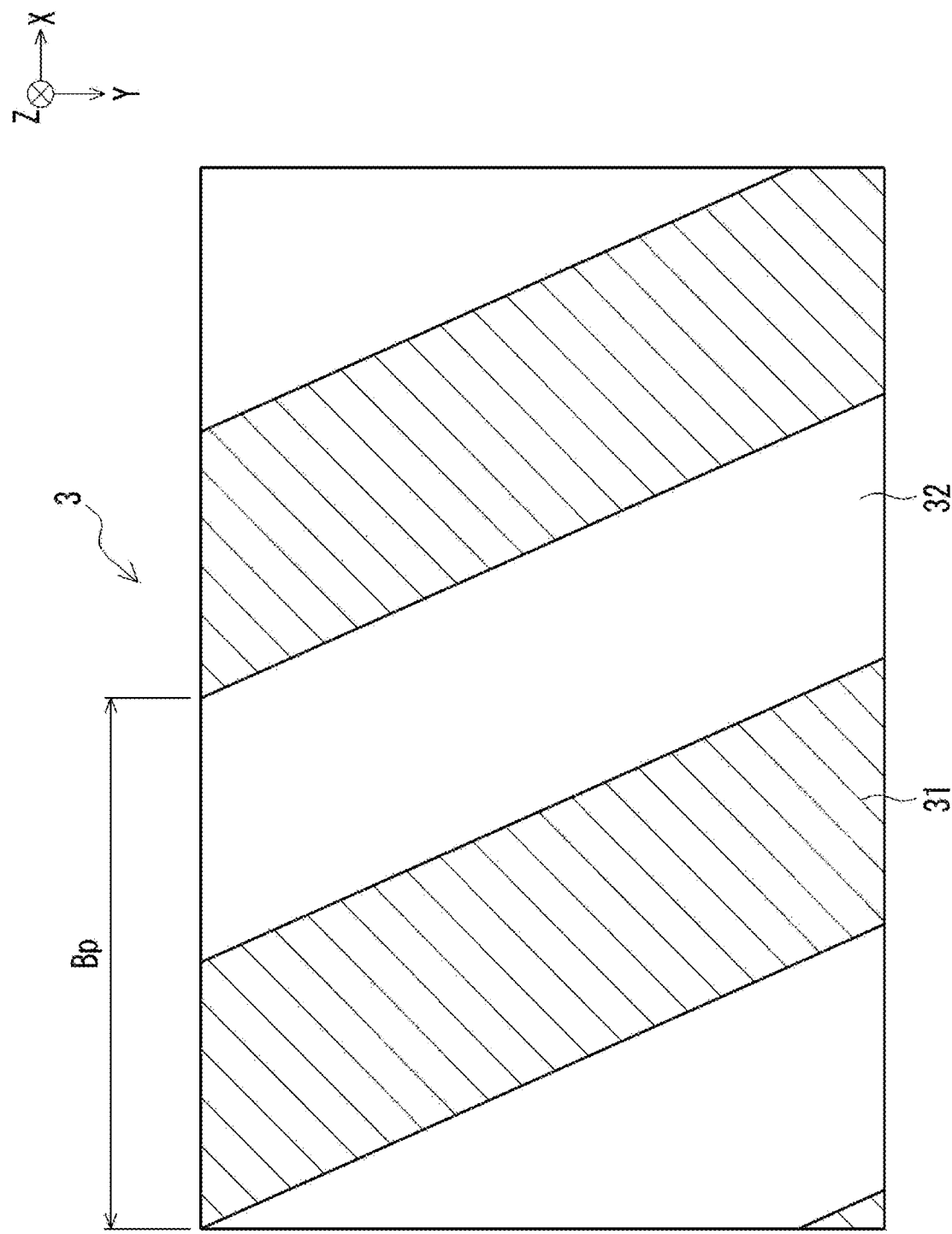
FIG. 4 is a diagram of an example barrier illustrated in FIG. 1 viewed in the depth direction.

The parallax barrier 3 defines a traveling direction of image light emitted from the subpixels for each of multiple transmissive portions 32. The traveling direction is the direction in which image light travels. As illustrated in FIG. 4, the transmissive portions 32 are strip areas each elongated in a predetermined direction in the plane. The predetermined direction is at a predetermined angle other than zero with the vertical direction. As illustrated in FIG. 2, the parallax barrier 3 defines the direction of image light emitted from each of the subpixels arranged in the active area 21 to define parts of the active area 21 viewable with the eyes of the user. Parts in the active area 21 emitting image light that reaches the positions of the eyes of the user are hereafter referred to as viewable sections 21a. Parts in the active area 21 emitting image light that reaches the position of the left eye of the user are hereafter referred to as left viewable sections 21aL (first viewable sections). Parts in the active area 21 emitting image light that reaches the position of the right eye of the user are referred to as right viewable sections 21aR (second viewable sections).

More specifically, as illustrated in FIG. 4, the parallax barrier 3 includes multiple light-blocking portions 31 to block image light. The multiple light-blocking portions 31 define transmissive portions 32 between adjacent light-blocking portions 31. The transmissive portions 32 have a higher light transmittance than the light-blocking portions 31. The light-blocking portions 31 have a lower light transmittance than the transmissive portions 32.

The transmissive portions 32 are parts of the parallax barrier 3 to transmit light incident on the parallax barrier 3. The transmissive portions 32 may transmit light with a transmittance of a first predetermined value or greater. The first predetermined value may be, for example, about 100% or a value less than 100%. The first predetermined value can be a value less than 100%, such as 80% or 50%, when image light emitted from the active area 21 falls within the range of good visibility. The light-blocking portions 31 are parts of the parallax barrier 3 to substantially block light incident on the parallax barrier 3. In other words, the light-blocking portions 31 prevent an image displayed in the active area 21 on the display panel 2 from being viewable with the eyes 11 of the user. The light-blocking portions 31 may transmit light with a transmittance of a second predetermined value or less. The second predetermined value may be, for example, substantially 0% or a greater value close to 0%, such as 0.5%, 1%, or 3%. The first predetermined value can be several times, or for example, 10 times, greater than the second predetermined value.

The transmissive portions 32 and the light-blocking portions 31 extend in a predetermined direction along the active area 21. The transmissive portions 32 and the light-blocking portions 31 are arranged alternately in a direction orthogonal to the predetermined direction. The transmissive portions 32 define the traveling direction of image light emitted from each of the subpixels.

As illustrated in FIG. 2, a barrier pitch Bp as an interval at which the transmissive portions 32 are arranged in the horizontal direction and the gap g between the active area 21 and the parallax barrier 3 are determined to satisfy Formula 1 and Formula 2 below using an optimum viewing distance d and a reference value (reference distance) E0 of an interocular distance E.

$$E0:d=(n \times Hp):g \tag{1}$$

$$d:Bp=(d+g):(2 \times n \times Hp) \tag{2}$$

Figure 3:
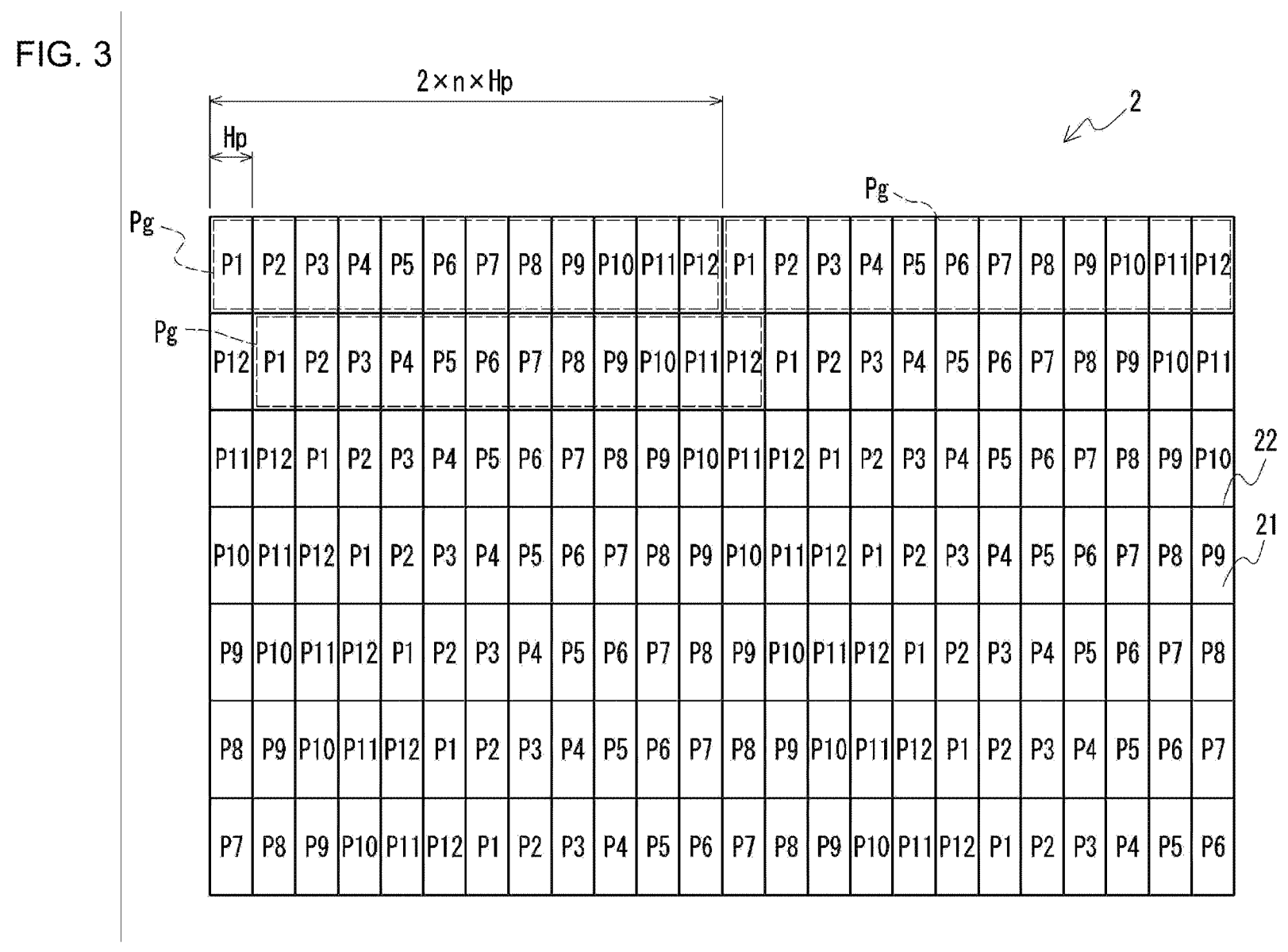

The optimum viewing distance d is the distance between a right eye 11R or a left eye 11L of the user and the parallax barrier 3. At the optimum viewing distance d, the horizontal length of each viewable section 21a is equivalent to n subpixels. The direction of a straight line passing through the right eye 11R and the left eye 11L (interocular direction) corresponds to the horizontal direction. The reference value E0 of the interocular distance E is the reference interocular distance E of the user. The reference value E0 may be, for example, 61.1 to 64.4 mm, as calculated through studies conducted by the National Institute of Advanced Industrial Science and Technology. Hp is the horizontal length of a subpixel as illustrated in FIG. 3.

The parallax barrier 3 may be a film or a plate with a transmittance less than the second predetermined value. In this case, the light-blocking portions 31 are parts of the film or plate. The transmissive portions 32 are slits in the film or plate. The film may be made of resin or another material. The plate may be made of resin, metal, or another material. The parallax barrier 3 may be made of a material other than a film or a plate. The parallax barrier 3 may include a base made of a light-blocking material or a material containing an additive with light-blocking properties.

The parallax barrier 3 may be, for example, a liquid crystal shutter. The liquid crystal shutter can control the light transmittance in accordance with a voltage applied. The liquid crystal shutter may include multiple pixels and control the light transmittance of each pixel. The liquid crystal shutter can form a portion with a high light transmittance or a portion with a low light transmittance in an intended shape. For the parallax barrier 3 being a liquid crystal shutter, the transmissive portions 32 may have a transmittance of the first predetermined value or greater. For the parallax barrier 3 being a liquid crystal shutter, the light-blocking portions 31 may have a transmittance of the second predetermined value or less.

In this structure, the parallax barrier 3 transmits image light emitted from selected subpixels in the active area 21 through the transmissive portions 32 to reach the right eye 11R of the user. The parallax barrier 3 transmits image light emitted from the other subpixels through the transmissive portions 32 to reach the left eye 11L of the user. An image viewable with the eyes 11 of the user when image light reaches each of the right eye 11R and the left eye 11L of the user will now be described in detail with reference to FIGS. 5 and 6.

As described above, the left viewable sections 21aL in FIG. 5 are defined on the active area 21 and viewable with the left eye 11L of the user when image light transmitted through the transmissive portions 32 of the parallax barrier 3 reaches the left eye 11L of the user. Left unviewable sections 21bL are unviewable with the left eye 11L of the user when image light is blocked by the light-blocking portions 31 of the parallax barrier 3. The left viewable sections 21aL include a half of the subpixels P1, all of the subpixels P2 to P6, and a half of the subpixels P7.

Figure 6:
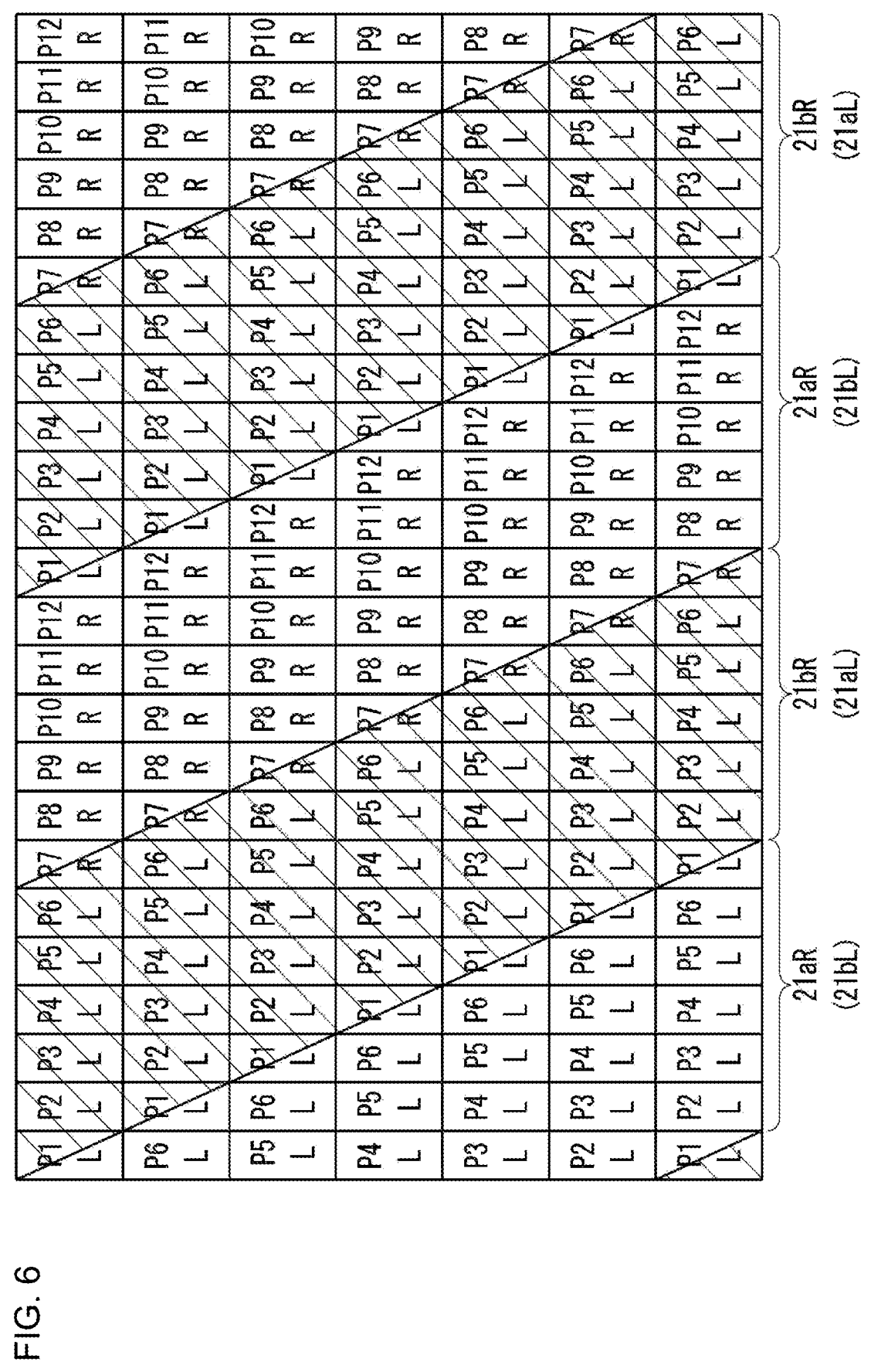

The right viewable sections 21aR in FIG. 6 are defined on the active area 21 and viewable with the right eye 11R of the user when image light from the other subpixels transmitted through the light transmissive portions 32 of the parallax barrier 3 reaches the right eye 11R of the user. Right unviewable sections 21bR are unviewable with the right eye 11R of the user when image light is blocked by the light-blocking portions 31 of the parallax barrier 3. The right viewable sections 21aR include a half of the subpixels P7, all of the subpixels P8 to P12, and a half of the subpixels P1.

Figure 5:
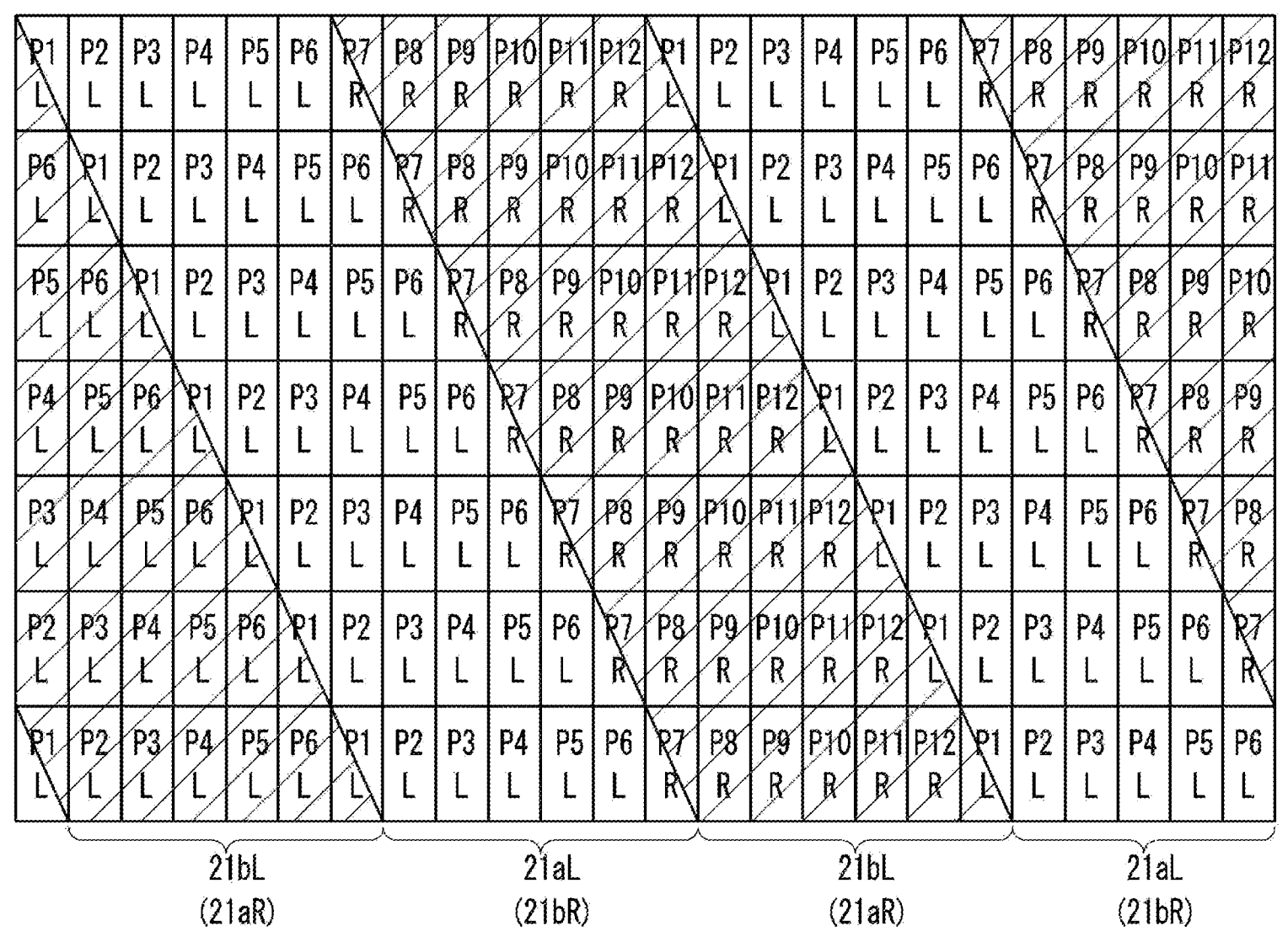

The left eye image displayed by the subpixels P1 to P6 are viewable with the left eye 11L. The right eye image displayed by the subpixels P7 to P12 are viewable with the right eye 11R. The right eye image and the left eye image have parallax between them and are included in a parallax image. More specifically, the left eye 11L views a half of the left eye image displayed by the subpixels P1, all the left eye images displayed by the subpixels P2 to P6, and a half of the right eye image displayed by the subpixels P7. The right eye 11R views a half of the right eye image displayed by the subpixels P7, all the right eye images displayed by the subpixels P8 to P12, and a half of the left eye image displayed by the subpixels P1. In FIGS. 5 and 6, subpixels to show the left eye image are each given reference sign L, and subpixels to show the right eye image are each given reference sign R.

In this state, the left eye 11L of the user views the largest area of the left eye image, and the smallest area of the right eye image. The right eye 11R of the user views the largest area of the right eye image, and the smallest area of the left eye image. Thus, the user can view a 3D image with least crosstalk.

In the 3D display device 1 with the structure described above, the user with the interocular distance E being the reference value E0 can appropriately view a 3D image when the left eye image is displayed by subpixels included in the left viewable sections 21aL, and the right eye image having parallax with the left eye image are displayed by subpixels included in the right viewable sections 21aR. In the structure described above, the left eye image is displayed by subpixels with at least its half being viewable with the left eye 11L, and the right eye image is displayed by subpixels with at least its half being viewable with the right eye 11R. In some embodiments, subpixels to display the left eye image or the right eye image may be determined as appropriate to minimize crosstalk based on the left viewable sections 21aL and the right viewable sections 21aR in accordance with the design of, for example, the active area 21 and the parallax barrier 3. For example, the left eye image may be displayed by subpixels with at least a predetermined proportion being viewable with the left eye 11L in accordance with the aperture ratio or other factors of the parallax barrier 3, and the right eye image may be displayed by subpixels with at least a predetermined proportion being viewable with the right eye 11R.

The controller 5 may be connected to the components of the 3D display device 1 to control these components. The components controlled by the controller 5 include the detector 4 and the display panel 2. The controller 5 may be, for example, a processor. The controller 5 may include one or more processors. The processors may include a general-purpose processor that reads a specific program and performs a specific function, and a processor dedicated to specific processing. The dedicated processor may include an application-specific integrated circuit (ASIC). The processor may include a programmable logic device (PLD). The PLD may include a field-programmable gate array (FPGA). The controller 5 may be either a system on a chip (SoC) or be a system in a package (SiP) in which one or more processors cooperate with other components. The controller 5 may include a storage, and store various items of information or programs to operate each component of the 3D display device 1. The storage may be, for example, a semiconductor memory. The storage may function as a work memory for the controller 5.

The memory 8 may include any storage such as a random-access memory (RAM) or a read-only memory (ROM). The memory 8 stores one or more of a first table, a second table, and a third table, which will be described in detail later. The memory 8 stores one or more of a fourth table, a fifth table, and a sixth table, which will be described in detail later.

The interocular distance measurement method implementable by the 3D display device 1 will now be described.

Figure 7:
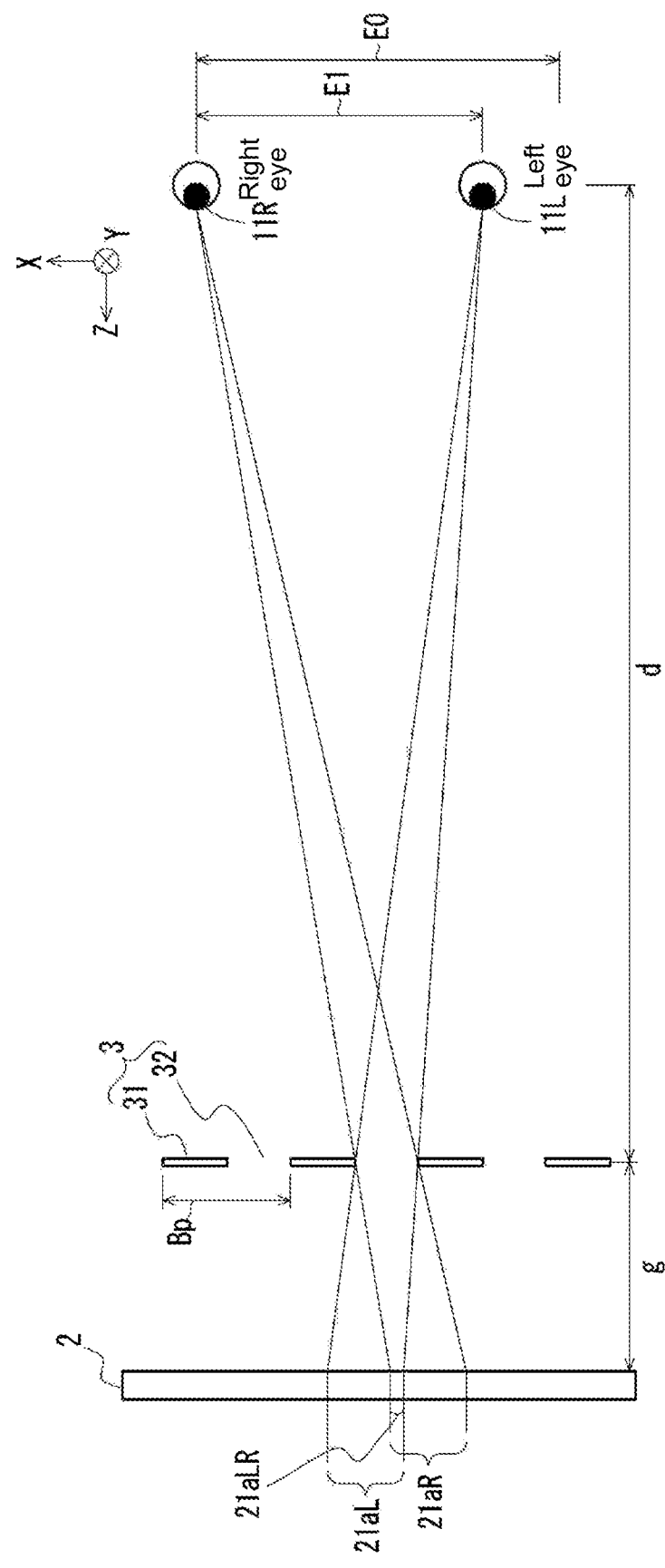
FIG. 7 is a diagram describing binocular viewable sections in the 3D display device illustrated in FIG. 1.

As illustrated in FIG. 7, with the interocular distance E of the user being an interocular distance E1 different from the reference value E0, a part of the left viewable sections 21aL and a part of the right viewable sections 21aR may overlap each other to define a binocular viewable section 21aLR. Thus, some subpixels are left subpixels (first subpixels) determined to display the left eye image based on the left viewable sections 21aL, and are also right subpixels (second subpixels) determined to display the right eye image based on the right viewable sections 21aR. The left subpixels each are, for example, a subpixel with at least a predetermined proportion (e.g., a half) being in the left viewable sections 21aL. The right subpixels each are a subpixel with at least a predetermined proportion being in the right viewable sections 21aR.

In this structure, with the right eye image displayed by subpixels that are left subpixels and also right pixels, the number of right eye images viewable with the left eye 11L increases. With the left eye image displayed by subpixels that are left subpixels and also right pixels, the number of left eye images viewable with the right eye 11R increases. Thus, when either the left eye image or the right eye image is displayed by the overlapping subpixels, crosstalk can increase. The controller 5 performs control to reduce crosstalk that may be generated when the user with the interocular distance E1 views a 3D image formed based on the reference value E0. For such control, the interocular distance E1 of the user is to be measured.

Measuring Interocular Distance E1

Figure 8:
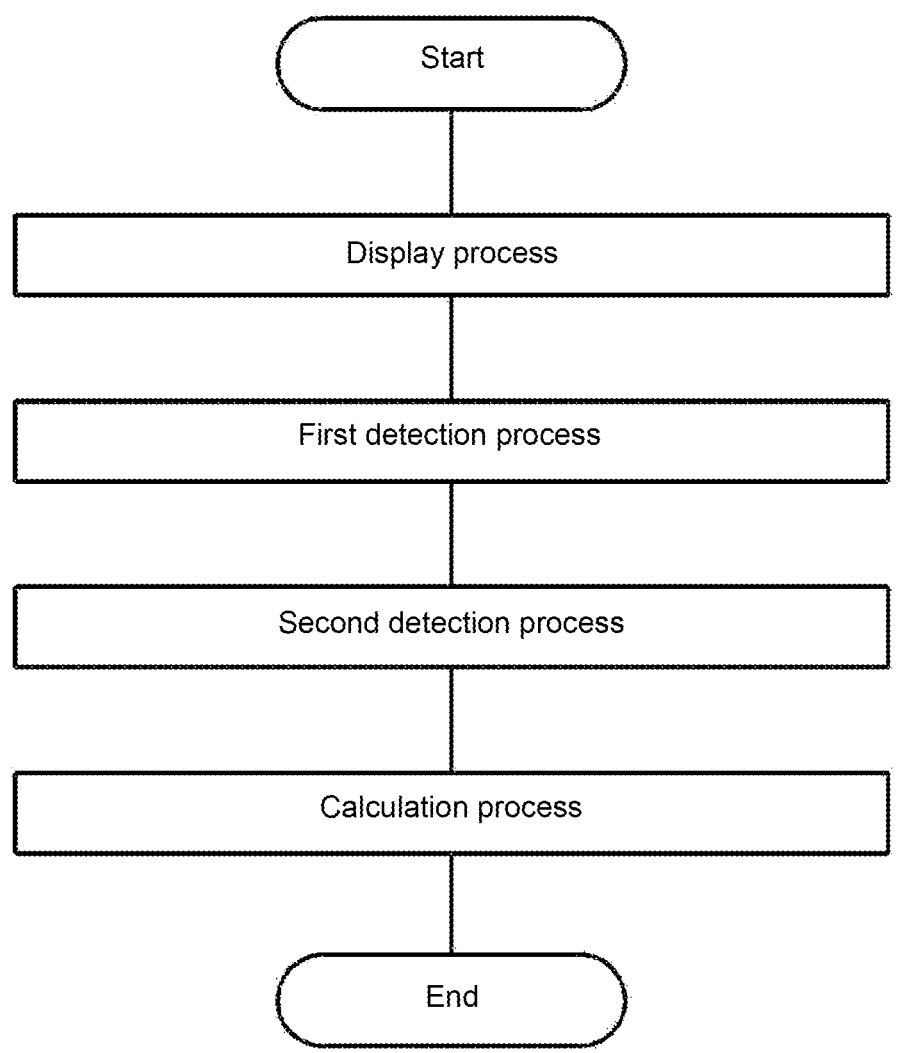
FIG. 8 is a flowchart of an interocular distance measurement method according to the present embodiment.

As illustrated in FIG. 8, the interocular distance measurement method implementable by the 3D display device 1 includes a display process, a first detection process, a second detection process, and a calculation process. The 3D display device 1 may start measuring the interocular distance in response to, for example, the user operating the input unit to start measuring the interocular distance.

Display Process

The controller 5 first determines a tracking range Δz in the third direction. The tracking range Δz may be a range in the third direction in which the right eye 11R and the left eye 11L of the user are estimated to be located. The tracking range Δz may be determined based on an eyellips set for the movable body 10. The right eye 11R may be referred to as a first eye 11R. The left eye 11L may be referred to as a second eye 11L.

Figure 9:
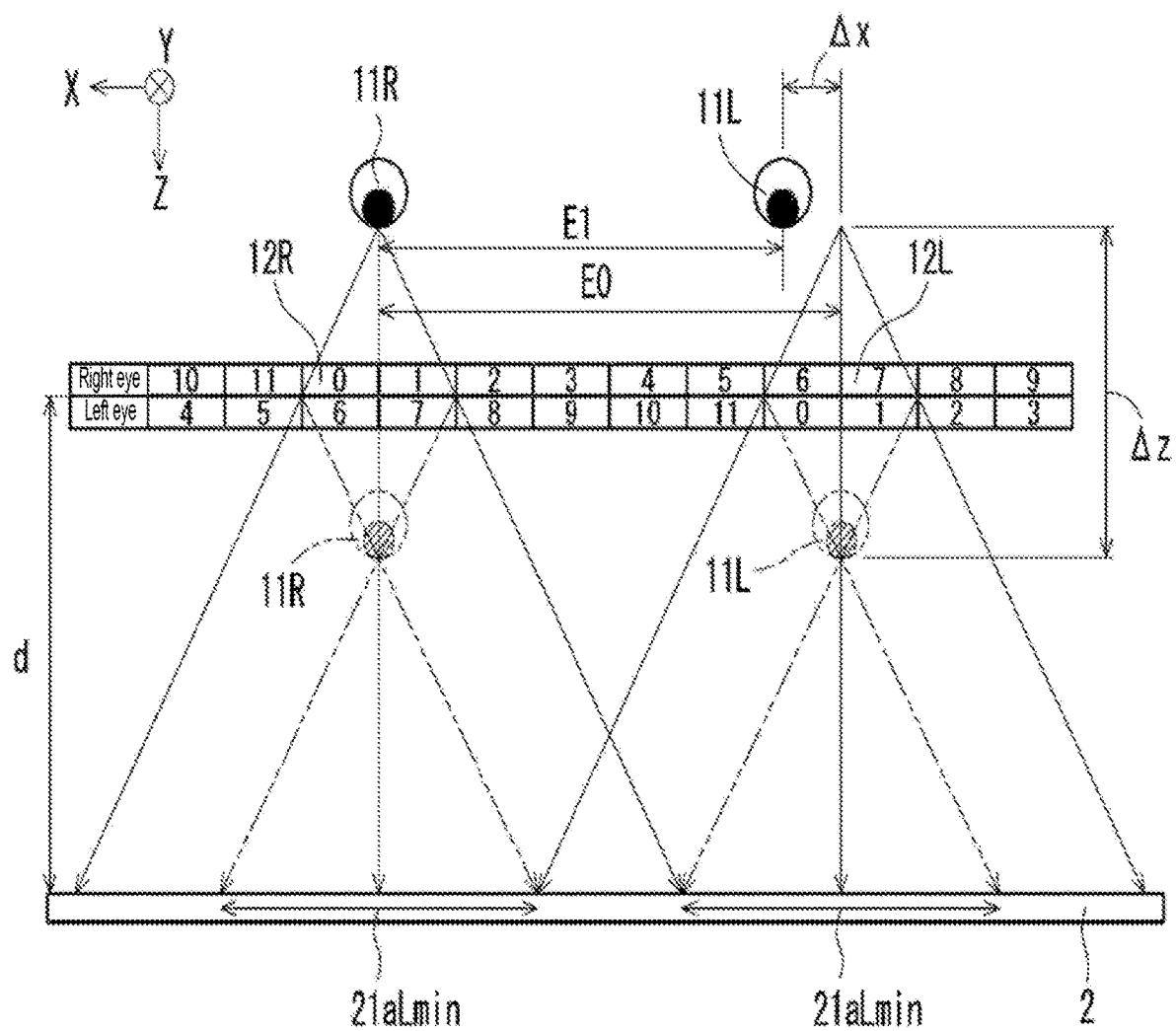
FIG. 9 is a diagram describing the interocular distance measurement method according to the present embodiment.

As illustrated in FIG. 9, a left dot area 12L corresponding to the first subpixels on the display surface and a right dot area 12R corresponding to the second subpixels on the display surface are virtually defined in accordance with the optimum viewing distance d and the reference value E0 of the interocular distance E. For the user with the interocular distance E being the reference value E0 and the first eye 11R and the second eye 11L at the optimum viewing distance d, the right dot area 12R may be referred to as the position of the first eye 11R, and the left dot area 12L may be referred to as the position of the second eye 11L. With the reference value E0 of the interocular distance E maintained, the controller 5 varies the distance between the first eye 11R and the parallax barrier 3 or between the second eye 11L and the parallax barrier 3 within the tracking range Δz to obtain minimum areas (viewable sections) 21aRmin and 21aLmin on the display panel 2, from which image light is emitted to enter the first eye 11R and the second eye 11L. The controller 5 causes the first subpixels and the second subpixels in the respective obtained minimum areas to display an image for interocular distance measurement. The image for the interocular distance measurement may include a first image and a second image. The controller 5 may switch between the first image and the second image to be displayed. The first image and the second image may be, for example, two temporary consecutive images. The first image and the second image may have a difference between them. The difference between the first image and the second image may be viewable by the user. The controller 5 may switch between the first image and the second image, for example, every 0.1 to 0.5 seconds.

First Detection Process

In the first detection process, the 3D display device 1 detects a first position x1 of the face of the user in response to a user instruction based on an image viewable with the first eye 11R. The user can provide an instruction to the 3D display device 1 with the input unit included in the 3D display device 1. The detector 4 can detect the first position x1. The user may provide the instruction based on the image viewable with the first eye 11R in response to the difference between the first image and the second image being minimum. This can identify the position of the head of the user in the first direction (x-direction) when the first eye 11R overlaps the right dot area 12R in the traveling direction of image light.

In the first detection process, the 3D display device 1 may provide guidance to the user to view the image with the first eye 11R alone. The 3D display device 1 may provide guidance to the user to operate the input unit in response to the difference between the first image and the second image viewable with the first eye 11R being minimum. The user may receive guidance with voice or with an image.

Second Detection Process

After the first detection process, the 3D display device 1 performs the second detection process. In the second detection process, the 3D display device 1 detects a second position x2 of the face of the user in response to a user instruction based on an image viewable with the second eye 11L. The user can provide an instruction to the 3D display device 1 with the input unit included in the 3D display device 1. The detector 4 can detect the second position x2. The user may provide the instruction based on the image viewable with the second eye 11L in response to the difference between the first image and the second image being minimum. This can identify the position of the head of the user in the first direction (x-direction) when the second eye 11L overlaps the left dot area 12L in the traveling direction of image light.

With the interocular distance E1 different from the reference value E0, the user moves the head in the first direction to minimize the difference between the first image and the second image viewable with the second eye 11L. Thus, the second position x2 may be different from the first position x1.

The 3D display device 1 may provide guidance to the user to view the image with the second eye 11L alone. The 3D display device 1 may provide guidance to the user to view the image while the user is moving the head in the first direction. The 3D display device 1 may provide guidance to the user to operate the input unit in response to the difference between the first image and the second image viewable with the second eye 11L being minimum. The user may receive guidance with voice or with an image.

Calculation Process

In the calculation process, the 3D display device 1 calculates the interocular distance E1 of the user based on the first position x1 and the second position x2. To calculate the interocular distance E1, the 3D display device 1 first calculates a movement distance Δx of the head of the user in the first direction based on the first position x1 and the second position x2. The x-coordinate of the first position x1 subtracted from the x-coordinate of the second position x2 may yield the movement distance Δx. As illustrated in FIG. 9, the interocular distance E1 of the user can be obtained by subtracting the movement distance Δx from the reference distance E0. To calculate the movement distance Δx, the distance between the head of the user and the display panel 2 may be set as appropriate.

In this manner, the interocular distance E1 of the user can be measured. Based on the measured interocular distance E1, the 3D display device 1 allows the user to appropriately view 3D images. With the interocular distance measurement method according to the present embodiment, the camera included in the detector 4 may be a monocular camera, rather than a stereo camera. This allows the detector 4 with a simple structure to measure the interocular distance E1 of the user.

A correction method implementable by the 3D display device 1 will now be described.

Correction of Display Panel

Figure 10:
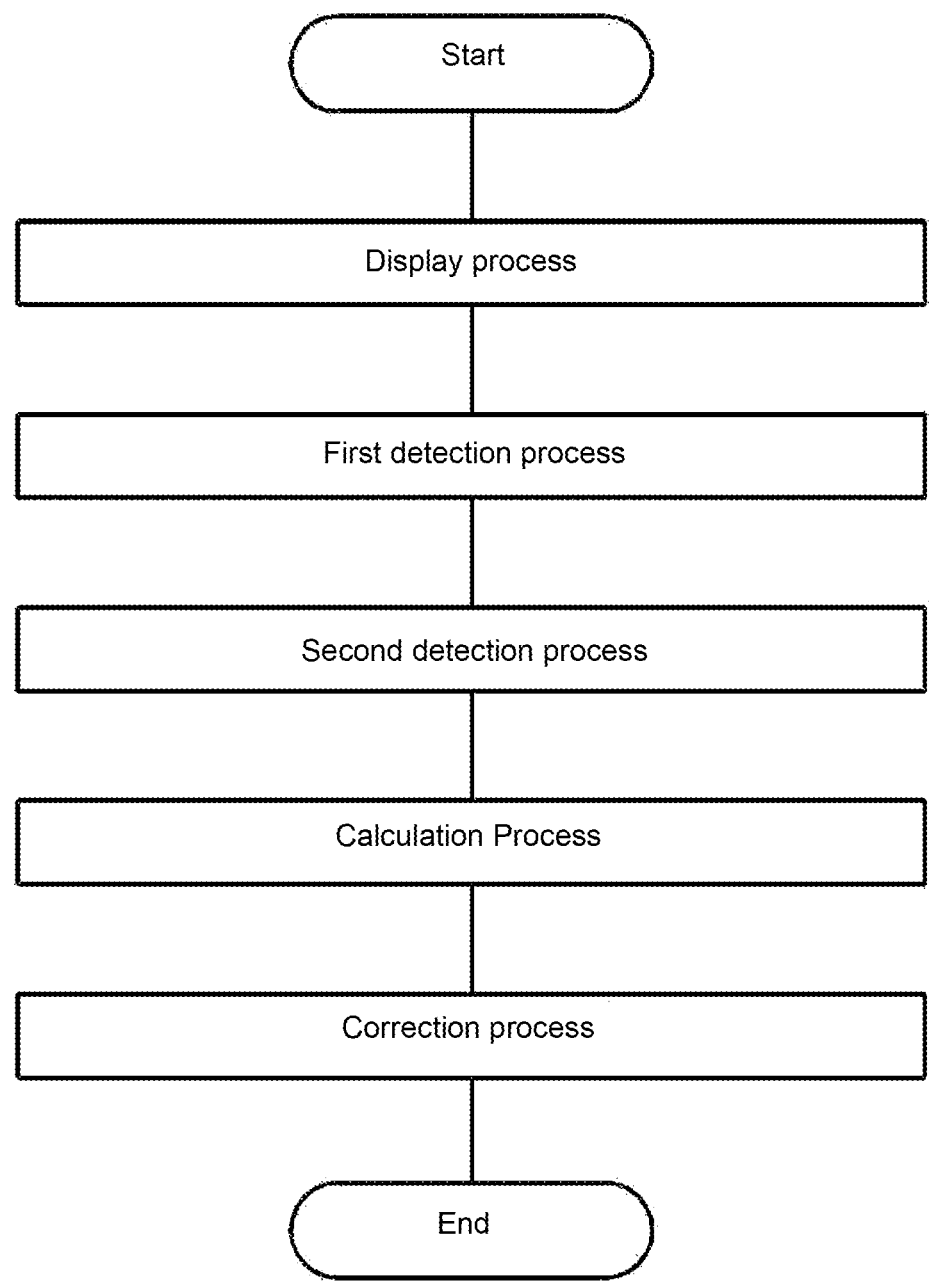
FIG. 10 is a flowchart of a correction method according to the present embodiment.

As illustrated in FIG. 10, the correction method implementable by the 3D display device 1 includes a display process, a first detection process, a second detection process, a calculation process, and a correction process. The correction process is to correct the display panel 2 based on the interocular distance E1 of the user. The 3D display device 1 may start correction when, for example, the user operates the input unit to start measuring the interocular distance.

The display process, the first detection process, the second detection process, and the calculation process in the correction method implementable by the 3D display device 1 may be the same as or similar to the display process, the first detection process, the second detection process, and the calculation process described above.

Determination of Third Pixels

The controller 5 determines third subpixels based on the positions of the eyes of the user in the horizontal direction. The third subpixels each are left subpixels with at least a predetermined proportion being in the left viewable sections 21aL, and also right subpixels with at least a predetermined proportion being in the right viewable sections 21aR. Example methods for determining the third subpixels will now be described.

First Example

When the detector 4 detects the position of the left eye (right eye), the controller 5 may perform calculation based on the position of the left eye (right eye), the gap g, the optimum viewing distance d, and the positions of the transmissive portions 32 to determine the right viewable sections 21aR.

Figure 11:
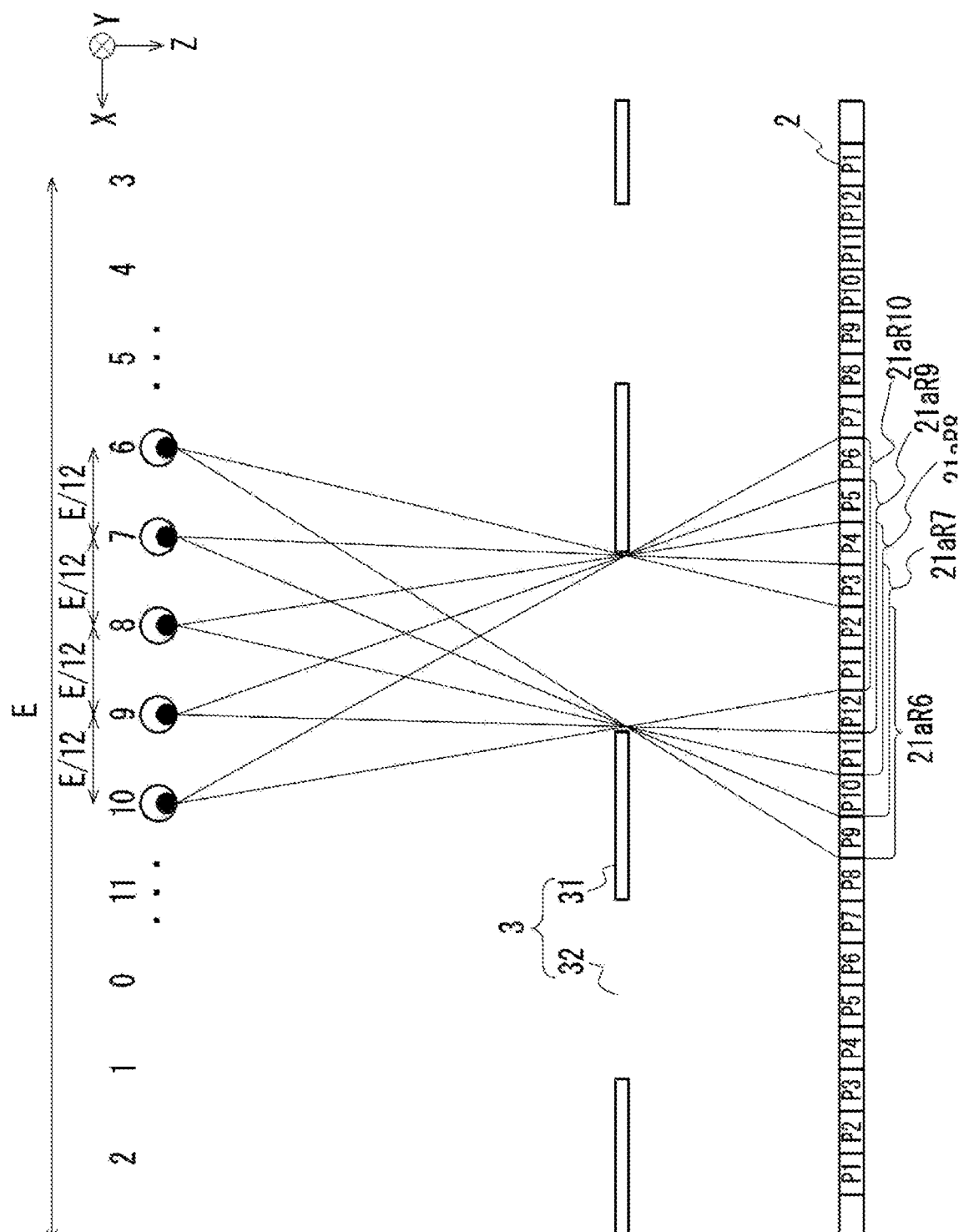
FIG. 11 is a diagram describing in detail the right viewable sections on the display in accordance with the position of a right eye.

For example, with the right eye at the position 10 as illustrated in FIG. 11, the controller 5 performs calculation based on the gap g, the optimum viewing distance d, and the position of the transmissive portion 32 to determine the right viewable sections 21aR to be right viewable sections 21aR10. The controller 5 determines right subpixels with at least a predetermined proportion being in the right viewable sections 21aR10. In the example illustrated in FIG. 11, the controller 5 may determine the subpixels P1 to P6 to be the right subpixels. Based on the right viewable sections 21aR, the controller 5 may use any method to determine the right subpixels that display a maximum right eye image viewable with the right eye.

With the right eye at the position 9, the controller 5 performs calculation based on the gap g, the optimum viewing distance d, and the position of the transmissive portion 32 to determine the right viewable sections 21aR to be right viewable sections 21aR9. The controller 5 determines right subpixels with at least a predetermined proportion being in the right viewable sections 21aR9. In the example illustrated in FIG. 11, the controller 5 may determine the subpixels P12 and P1 to P5 to be the right subpixels.

As described above, the barrier pitch Bp, the gap g, and the optimum viewing distance d are predefined with the interocular distance E being the reference value E0 to eliminate an overlap of the left viewable sections 21aL and the right viewable sections 21aR. In the structure that forms the basis of the present disclosure, the controller 5 thus obtains, for example, the position of a right eye alone, determines right viewable sections 21aR based on the position of a left eye, and determines an area excluding the right viewable sections 21aR to be the left viewable sections 21aL. In the present embodiment, the controller 5 performs calculation based on the position of the left eye of the user detected by the detector 4, the position of the barrier aperture area, the gap g, and the optimum viewing distance d to determine the left viewable sections 21aL. Based on the left viewable sections 21aL, the controller 5 may determine right subpixels to display the right eye image. The controller 5 determines left subpixels based on the left viewable sections 21aL in the same manner as for the controller 5 determining right subpixels based on the right viewable sections 21aR.

After determining the left subpixels and the right subpixels, the controller 5 determines the third subpixels that are the left subpixels and are also the right subpixels.

Second Example

Figure 12:
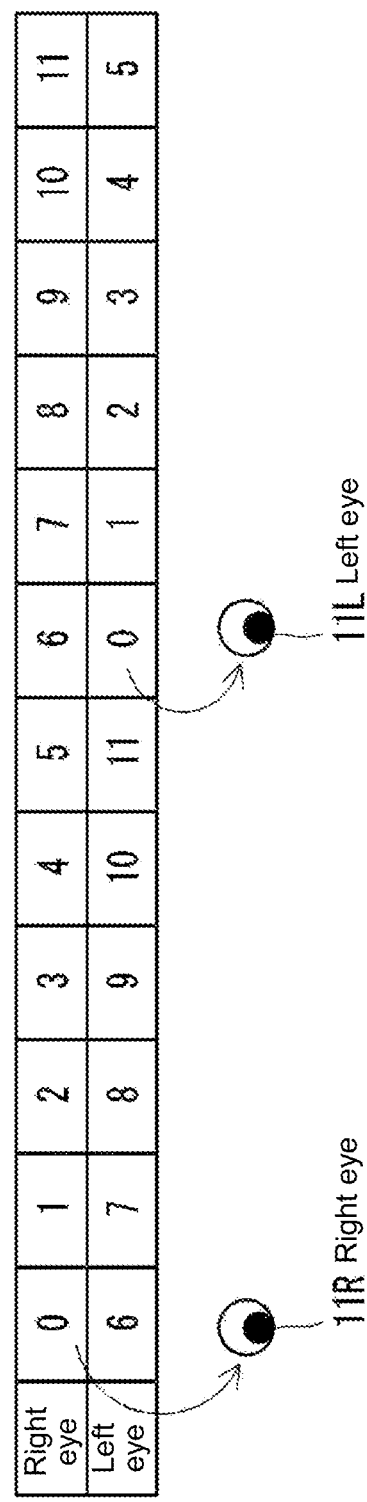
FIG. 12 is a diagram describing information for identifying the position of a left eye and the position of the right eye.

The controller 5 may use the first table prestored in the memory 8 to determine the third subpixels. In the present embodiment, the positions of the right eye and the left eye in the horizontal direction are identified using pieces of information 0 to 11 as illustrated in FIG. 12. With the interocular distance being the reference value, information identifying the position of the right eye is the same as information identifying the position of the left eye.

As illustrated in FIG. 13, the first table stores the positions of the left eye and the right eye with the interocular distance E being the reference value E0, the corresponding left subpixels with at least a predetermined proportion being in the left viewable sections 21aL, and the corresponding right subpixels with at least a predetermined proportion being in the right viewable sections 21aR. The example shown in FIG. 13 includes the pieces of information 0 to 11 for identifying the positions of the eyes in the column direction, and the pieces of information P1 to P12 for identifying subpixels in the row direction. The first table shows that, for the eyes at each position, the corresponding subpixel is a left subpixel or a right subpixel. In FIG. 13, left refers to a left subpixel, and right refers to a right subpixel. As described with reference to FIG. 12, when the left eye is at the position 0 with the interocular distance being a reference value, the right eye is at the position 0. In this case, the subpixels P1 to P6 are left subpixels, and the subpixels P7 to P12 are right subpixels in the example shown in FIG. 13. When the left eye is at the position 1, the right eye is at the position 1. In this case, the subpixels P2 to P7 are left subpixels, and the subpixels P1 and P8 to P12 are right subpixels.

For an image displayed in accordance with the first table in FIG. 13 based on the position of the right eye with the interocular distance E not being the reference value E0, the subpixels to display the left eye image to the left eye display the right eye image. More specifically, when the left eye is at the position 11 and the right eye is at the position 0, the controller 5 causes the subpixels P1 to P6 to display the left eye image based on the position 0 of the right eye and causes the subpixels P7 to P12 to display the right eye image. As shown in the first table, the subpixels P1 to P5 and P12 are to display the left eye image based on the position 11 of the left eye. Thus, when the subpixels display images based on the position of the right eye, the user views the right eye image displayed by the subpixel P12. This increases the number of right eye images viewable with the left eye and increases crosstalk.

The controller 5 determines the third subpixels to be subpixels that are right subpixels with at least a predetermined proportion being in the right viewable sections 21aR determined based on the position of the right eye, and are also left subpixels with at least a predetermined proportion being in the left viewable sections 21aL determined based on the position of the left eye.

For example, when the detector 4 detects the right eye at the position 0, the controller 5 uses the first table to determine the subpixels P7 to P12 to be right subpixels based on the position 0 of the right eye. When the detector 4 detects the left eye at the position 11, the controller 5 uses the first table to determine the subpixels P1 to P5 and P12 to be left subpixels based on the position of the left eye. Thus, the controller 5 determines the third subpixel to be the subpixel P12.

Third Example

The controller 5 may use the second table to determine the third subpixels. The second table prestored in the memory 8 shows the positions of the right eye and the positions of the left eye and the corresponding third subpixels.

As described above, the left viewable sections 21aL and the right viewable sections 21aR may be determined based on the position of the left eye and the position of the right eye. The left subpixels may be determined based on the left viewable sections 21aL, and the right subpixels may be determined based on the right viewable sections 21aR. The third subpixels may be determined based on the left subpixels and the right subpixels. As illustrated in FIG. 14, the second table can thus store the third subpixels corresponding to the position of the left eye and the position of the right eye.

The controller 5 determines the third subpixels to be subpixels stored in the second table corresponding to the position of the right eye and the position of the left eye. The example shown in FIG. 14 includes 0 to 11 as pieces of information identifying the position of the left eye in the row direction, and 0 to 11 as pieces of information identifying the position of the right eye in the column direction. The example in FIG. 14 also includes pieces of information about subpixels to be the third subpixels corresponding to the pieces of information identifying the position of the left eye and the pieces of information identifying the position of the right eye.

When causing the detector 4 to detect, for example, the left eye at the position 11 and the right eye at the position 0, the controller 5 determines the third subpixel to be the subpixel P6 that corresponds to the position 11 of the left eye and the position 0 of the right eye in the second table.

Determination of Fourth Subpixels

The controller 5 determines fourth subpixels based on the positions of the eyes of the user. The fourth subpixels are neither left subpixels nor right subpixels. For example, the controller 5 may determine left subpixels and right subpixels as in the first example and in the second example above. The controller 5 may determine subpixels that are neither left subpixels nor right subpixels to be the fourth subpixels.

As described above, the left viewable sections 21aL and the right viewable sections 21aR may be determined based on the position of the left eye and the position of the right eye. The left subpixels are determined based on the left viewable sections 21aL, and the right subpixels are determined based on the right viewable sections 21aR. The fourth subpixels are determined based on the left subpixels and the right subpixels. The memory 8 can thus store the third table showing the fourth subpixels corresponding to the position of the left eye and the position of the right eye. With the memory 8 storing the third table, the controller 5 may determine the fourth subpixels to be subpixels stored in the third table corresponding to the position of the left eye and the position of the right eye.

Display of Image

The controller 5 then causes subpixels that are left subpixels and are not right subpixels to display the left eye image. The controller 5 causes subpixels that are right subpixels and are not left subpixels to display the right eye image. The controller 5 causes the third subpixels to display the third image.

The controller 5 may cause the third subpixels to display, for example, a black image as the third image. The black image is, for example, a black image with a predetermined luminance level. The predetermined luminance level may be a luminance level with the lowest gradation displayable by the subpixels, or a value corresponding to the luminance level with the gradation equivalent to the lowest gradation. The controller 5 may cause the third subpixels to display the black image.

The controller 5 may cause the third subpixels to display either the left eye image or the right eye image as the third image based on the characteristics of the user. The characteristics of the user include, for example, a dominant eye of the user. More specifically, the controller 5 may cause, based on information about the dominant eye of the user preset or input from an external source, either the left eye image or the right eye image corresponding to the dominant eye to be displayed. The controller 5 may cause the left eye image to be displayed as the third image when the user has a dominant left eye. The controller 5 may cause the right eye image to be displayed as the third image when the user has a dominant right eye.

The controller 5 may cause the third subpixels to display an average image as the third image. The average image has an average luminance value of the left eye image and the right eye image.

Figure 15:
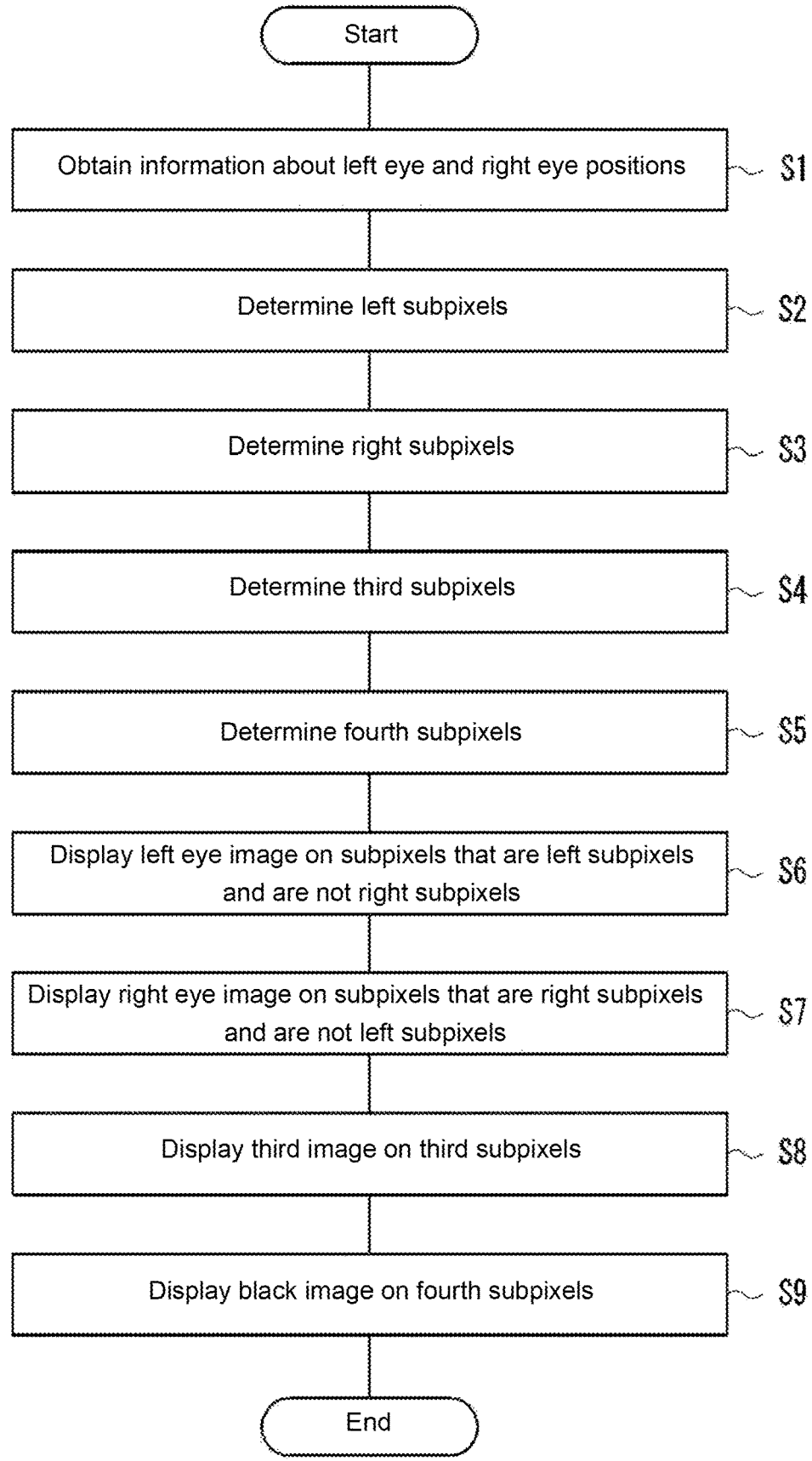
FIG. 15 is a flowchart of a correction process included in the correction method according to the present embodiment.

An example process performed by the 3D display device 1 with the interocular distance E not being the reference value E0 will now be described with reference to FIG. 15.

The controller 5 obtains information about the positions of the left eye and the right eye of the user from the detector 4 (step S1).

In response to obtaining the information about the position of the left eye in step S1, the controller 5 determines the left viewable sections 21aL based on the position of the left eye, and determines the left subpixels based on the left viewable sections 21aL (step S2).

In response to determining the left viewable sections 21aL in step S2, the controller 5 determines the right viewable sections 21aR based on the position of the right eye in the information obtained in step S1, and determines the right subpixels based on the right viewable sections 21aR (step S3).

In response to determining the left subpixels in step S2 and the right subpixels in step S3, the controller 5 determines the third subpixels based on the left subpixels and the right subpixels (step S4). The controller 5 may determine the third subpixels based on the information about the positions of the right eye and the left eye obtained in step S1.

In response to determining the third subpixels in step S4, the controller 5 determines the fourth subpixels based on the left subpixels and the right subpixels (step S5). The controller 5 may determine the fourth subpixels based on the information about the positions of the right eye and the left eye obtained in step S1.

In response to determining the fourth subpixels in step S5, the controller 5 causes subpixels that are left subpixels and are not right subpixels to display the left eye image (step S6).

In response to the left eye image displayed in step S6, the controller 5 causes subpixels that are right subpixels and are not left subpixels to display the right eye image (step S7).

In response to the right eye image displayed in step S7, the controller 5 causes the third subpixels to display the third image (step S8).

In response to the third image displayed by the third subpixels in step S8, the controller 5 causes the fourth subpixels to display the black image (step S9).

In the present embodiment as described above, the controller 5 determines the left viewable sections 21aL and the right viewable sections 21aR based on the interocular distance E1 of the user (in other words, the position of the right eye 11R and the position of the left eye 11L of the user). Thus, with the interocular distance E not being the reference distance E0, areas viewable with the right eye 11R and areas viewable with the left eye 11L are determined accurately.

In the present embodiment, the controller 5 determines the left subpixels based on the left viewable sections 21aL and the right subpixels based on the right viewable sections 21aR. The controller 5 causes subpixels that are the left subpixels and are not the right subpixels to display the left eye image. The controller 5 causes subpixels that are the right subpixels and are not the left subpixels to display the right eye image. The controller 5 causes the third subpixels to display the third image. With the interocular distance E not being the reference distance E0, an image viewable with the eyes 11 of the user is controlled to reduce crosstalk. This allows the user to appropriately view 3D images.

In the present embodiment, the controller 5 can use the first table to determine the right subpixels based on the position of the right eye. The first table shows the positions of the right eye 11R and the positions of the left eye 11L at the reference distance E0 away from the right eye 11R, and the corresponding images to be displayed by the subpixels. The controller 5 can use the first table to determine the left subpixels based on the position of the left eye. Thus, the controller 5 can eliminate calculation of the left viewable sections 21aL and the right viewable sections 21aR, which is performed repeatedly when the information about the positions of the eyes is obtained based on the positions of the eyes and the structures of the parallax barrier 3 and the display panel 2. This reduces the processing load of the controller 5.

In the present embodiment, the controller 5 can cause, based on the characteristics of the user, either the left eye image or the right eye image to be displayed as the third image on the binocular viewable sections 21aLR. This can reduce discomfort of the user with, for example, the dominant eye of the user viewing an image corresponding to the dominant eye alone.

In the present embodiment, the controller 5 can display an image having an average luminance value of the left eye image and the right eye image as the third image. Thus, the left eye of the user views the image having a luminance level closer to the luminance level of the left eye image than that of the right eye image. The right eye of the user views the image having a luminance level closer to the luminance level of the right eye image than that of the left eye image. This allows the user to view a less uncomfortable image than the right eye image viewed with the left eye or than the left eye image viewed with the right eye.

In the present embodiment, the controller 5 can cause the black image with the luminance value less than a predetermined luminance value to be displayed as the third image. This can prevent the left eye of the user from viewing an image for the right eye and prevent the right eye of the user from viewing an image for the left eye. This thus reduces crosstalk.

In the present embodiment, the 3D display device 1 can include the memory 8 storing the second table showing the positions of the left eye, the positions of the right eye, and the corresponding third subpixels. The controller 5 can use the second table to determine the third subpixels based on the position of the left eye and the position of the right eye. Thus, the controller 5 can eliminate calculation of the left viewable sections 21aL and the right viewable sections 21aR, which is performed repeatedly when the information about the positions of the eyes is obtained based on the positions of the eyes and the structures of the parallax barrier 3 and the display panel 2. The controller 5 can eliminate determination of the left subpixels based on the left viewable sections 21aL and of the right subpixels based on the right viewable sections 21aR. This reduces the processing load of the controller 5.

In the present embodiment, the controller 5 causes the fourth subpixels to display a black image. Thus, the fourth subpixels do not emit any image light. Thus, stray light, which is generated by image light from the fourth subpixel and secondarily reflected by, for example, components in the parallax barrier 3, is less likely to reach the eyes of the user. This allows the left eye of the user to clearly view the left eye image and the right eye of the user to clearly view the right eye image without interference caused by stray light.

The structure according to the present disclosure is not limited to the structure described in the above embodiments but may be varied or changed variously. For example, the functions of the components are reconfigurable unless any contradiction arises. Multiple components may be combined into a single unit or a single component may be divided into separate units.

The drawings used herein for illustrating structures according to the present disclosure are schematic and are not drawn to scale relative to the actual size of each component.

In the present disclosure, the first, the second, or others are identifiers for distinguishing the components. The identifiers of the components distinguished with the first, the second, and others in the present disclosure are interchangeable. For example, the first eye is interchangeable with the second eye. The identifiers are to be interchanged together. The components for which the identifiers are interchanged are also to be distinguished from one another. The identifiers may be eliminated. The components without such identifiers can be distinguished with reference numerals. The identifiers such as the first and the second in the present disclosure alone should not be used to determine the order of components or to suggest the existence of smaller or larger number identifiers.

In the present disclosure, x-axis, y-axis, and z-axis are used for ease of explanation and may be interchangeable with one another. The orthogonal coordinate system including x-axis, y-axis, and z-axis is used to describe the structures according to the present disclosure. The positional relationship between the components in the present disclosure is not limited to being orthogonal.

The present disclosure may be implemented in the following forms.

In one or more embodiments of the present disclosure, an interocular distance measurement method is implementable by a three-dimensional display device. The method includes displaying an image, detecting a first position, detecting a second position, and calculating an interocular distance. The three-dimensional display device includes a display, a barrier, a detector, and a controller. The display displays a parallax image projected toward a first eye and a second eye of a user through an optical system. The barrier defines a traveling direction of image light of the parallax image to provide parallax between the first eye and the second eye. The detector detects a position of a face of the user. The displaying an image includes displaying an image for interocular distance measurement in a viewable section of the display determined based on a reference value of an interocular distance. The detecting a first position includes detecting a first position of the face of the user in response to an instruction, from the user, based on an image viewable with the first eye. The detecting a second position includes detecting a second position of the face of the user in response to an instruction, from the user, based on an image viewable with the second eye. The calculating an interocular distance includes calculating an interocular distance of the user through correction of the reference value based on the first position and the second position.

In one or more embodiments of the present disclosure, a correction method is implementable by a three-dimensional display device. The method includes displaying an image, detecting a first position, detecting a second position, calculating an interocular distance, and correcting the display. The three-dimensional display device includes a display, a barrier, a detector, and a controller. The display displays a parallax image projected toward a first eye and a second eye of a user through an optical system. The barrier defines a traveling direction of image light of the parallax image to provide parallax between the first eye and the second eye. The detector detects a position of a face of the user. The displaying an image includes displaying an image for interocular distance measurement in a viewable section of the display determined based on a reference value of an interocular distance. The detecting a first position includes detecting a first position of the face of the user in response to an instruction, from the user, based on an image viewable with the first eye. The detecting a second position includes detecting a second position of the face of the user in response to an instruction, from the user, based on an image viewable with the second eye. The calculating an interocular distance includes calculating an interocular distance of the user through correction of the reference value based on the first position and the second position. The correcting the display includes correcting the display based on the interocular distance of the user.

The structure according to one embodiment of the present disclosure allows the user to appropriately view a 3D image.

Although embodiments of the present disclosure have been described in detail, the present disclosure is not limited to the embodiments described above, and may be changed or varied in various manners without departing from the spirit and scope of the present disclosure. The components described in the above embodiments may be entirely or partially combined as appropriate unless any contradiction arises.

REFERENCE SIGNS 1 3D display device
2 display (display panel)
21 active area
21a viewable section
21aL left viewable section
21bL left unviewable section
21aL9 right viewable section
21aLR binocular viewable section
21aR right viewable section
21aR10 right viewable section
22 black matrix
3 barrier (parallax barrier)
31 light-blocking portion
32 transmissive portion
4 detector
5 controller
6 obtainer
7 illuminator
8 memory
10 movable body
11 eye
11R right eye (first eye)
11L left eye (second eye)
12L left dot area
12R right dot area
100 head-up display
110 optical system
120 projection reception member
130 optical path
140 virtual image

The invention claimed is:

1. An interocular distance measurement method implementable by a three-dimensional display device, the display device including
   a display configured to display a parallax image projected toward a first eye and a second eye of a user through an optical system,
   a barrier configured to define a traveling direction of image light of the parallax image to provide parallax between the first eye and the second eye,
   a detector configured to detect a position of a face of the user, and
   a controller,
   the interocular distance measurement method comprising:
   displaying an image for interocular distance measurement in a viewable section of the display determined based on a reference value of an interocular distance;
   detecting a first position of the face of the user in response to an instruction from the user, the instruction being based on an image viewable with the first eye;
   detecting a second position of the face of the user in response to an instruction from the user, the instruction being based on an image viewable with the second eye; and
   calculating an interocular distance of the user through correction of the reference value based on the first position and the second position.

2. The interocular distance measurement method according to claim 1, wherein
the displaying includes switching an image displayed in the viewable section alternately between a first image and a second image, and the first image and the second image have a difference between the first image and the second image.

3. The interocular distance measurement method according to claim 2, wherein
the instruction based on the image viewable with the first eye is provided in response to the difference viewable with the first eye being minimum.

4. The interocular distance measurement method according to claim 2, wherein
the instruction based on the image viewable with the second eye is provided in response to the difference viewable with the second eye being minimum.

5. A correction method implementable by a three-dimensional display device, the display device including
a display configured to display a parallax image projected toward a first eye and a second eye of a user through an optical system,
a barrier configured to define a traveling direction of image light of the parallax image to provide parallax between the first eye and the second eye,
a detector configured to detect a position of a face of the user, and
a controller,
the correction method comprising:
displaying an image for interocular distance measurement in a viewable section of the display determined based on a reference value of an interocular distance;
detecting a first position of the face of the user in response to an instruction from the user, the instruction being based on an image viewable with the first eye;
detecting a second position of the face of the user in response to an instruction from the user, the instruction being based on an image viewable with the second eye;
calculating an interocular distance of the user through correction of the reference value based on the first position and the second position; and
correcting the display based on the interocular distance of the user.

6. The correction method according to claim 5, wherein
the displaying includes switching an image displayed in the viewable section alternately between a first image and a second image, and the first image and the second image have a difference between the first image and the second image.

7. The correction method according to claim 6, wherein
the instruction based on the image viewable with the first eye is provided in response to the difference viewable with the first eye being minimum.

8. The correction method according to claim 6, wherein
the instruction based on the image viewable with the second eye is provided in response to the difference viewable with the second eye being minimum.

* * * * *